United States Patent [19]
Radke

[11] 3,731,949
[45] May 8, 1973

[54] FLAT BAG MADE OF TUBULAR SECTIONS

[75] Inventor: Donald G. Radke, Rochester, Mich.

[73] Assignee: Allied Chemical Corporation, New York, N.Y.

[22] Filed: May 12, 1971

[21] Appl. No.: 142,658

[52] U.S. Cl.................280/150 AB, 5/349, 9/11 A, 182/138
[51] Int. Cl..............................................B60r 21/08
[58] Field of Search.................280/150 AB; 9/11, 9/13, 12, 314; 182/137, 138; 5/349

[56] References Cited

UNITED STATES PATENTS

| | | | |
|---|---|---|---|
| 3,618,978 | 11/1971 | Klove, Jr. | 280/150 AB |
| 2,853,720 | 9/1958 | Friedlander | 5/349 |
| 3,510,150 | 5/1970 | Wilfert | 280/150 AB |
| 3,582,107 | 6/1971 | Goetz | 280/150 AB |
| 2,050,141 | 8/1936 | Wethington | 280/150 AB |
| 2,672,628 | 3/1954 | Spanel | 9/13 X |
| 1,733,034 | 10/1929 | Tufenkjian | 9/13 X |

*Primary Examiner*—Kenneth H. Betts
*Assistant Examiner*—John P. Silverstrim
*Attorney*—Jonathan Plaut

[57] ABSTRACT

This invention relates to a bag inflated for automotive passenger restraint, said bag having a minimum area which is inflatable to extend the bag over the area it must extend across to protect the passenger.

1 Claim, 3 Drawing Figures

PATENTED MAY 8 1973

3,731,949

INVENTOR
DONALD G. RADKE
BY

ATTORNEY

FLAT BAG MADE OF TUBULAR SECTIONS

This invention relates to a bag inflated for automotive passenger restraint, said bag having a minimum area which is inflatable to extend the bag over the area it must extend across to protect the passenger. More particularly, this invention relates to a bag for deployment in the rear seat of a vehicle which will contain the passengers in said rear seat from injury.

BACKGROUND OF THE INVENTION

Bags inflated by stored gas and/or generated gas for driver or passenger (whether driver or passenger, hereinafter referred to as the passenger) protection are well known in the art. These bags generally must be inflated within fifty milliseconds of crash impact in order to restrain the passenger from injurious movement.

Rapid inflation of the protective bag is therefore desired. Such rapid inflation is accomplished generally by one of three methods. That is, (1) by release of gas from a stored-compressed-gas source, (2) use of a stored gas source in combination with a generated gas, or (3) generation of gas into the bag for inflation. In any one of the cases, the bag inflates with the gas filling it so as to move in position to protect the passenger from injury.

For the rear seat of the automobile or other vehicle, it has been proposed to use one or more larger bags which would retain the passengers in the rear seat when inflated, and thus keep them from moving toward the front of the car and possibly into the front seat or windshield. Where the bag is of large size, such as above about 10 cubic feet when inflated, it is difficult to generate and/or use stored gas rapidly enough to inflate the bag in the minimum time required and referred to above, and such bags create an overpressure in the vehicle due to volume occupied and too high a decibel level on filling. It is the purpose of this invention to provide a gas bag for use alone or with other bags, preferably in the rear seat of an automobile, which will be inflated out to its fully extended size as a result of generated and/or stored gases entering therein within the time required.

BRIEF DESCRIPTION OF THE INVENTION

According to this invention, the bag referred to previously is made up of a plurality of inflatable areas which are connected together by non-inflatable areas of fabric, thus reducing the volume which has to be inflated by inflating gas. The inflatable areas will, of course, extend the non-inflatable areas upon inflation.

DETAILED DESCRIPTION OF THE INVENTION

Figure 1:
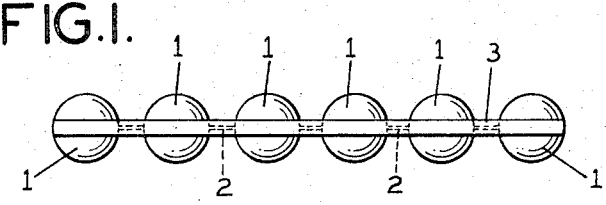
Figure 2:
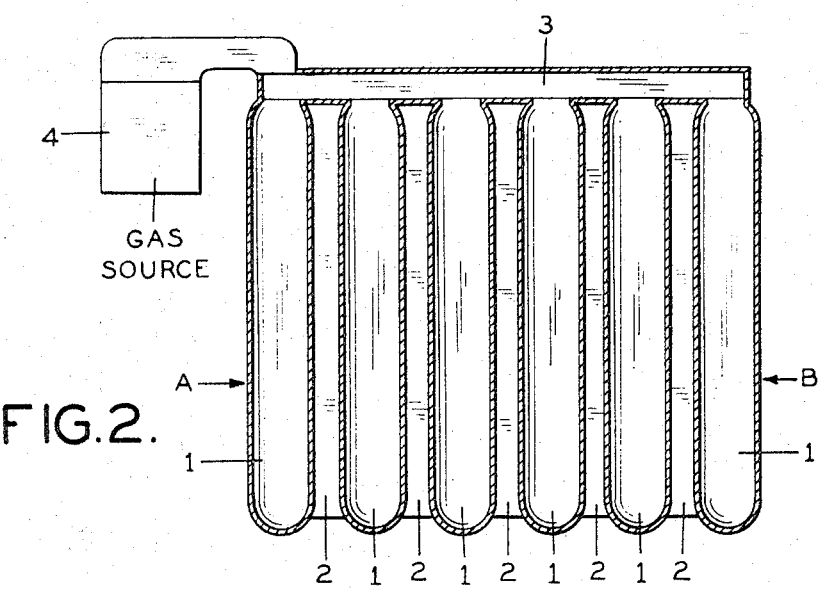
Figure 3:
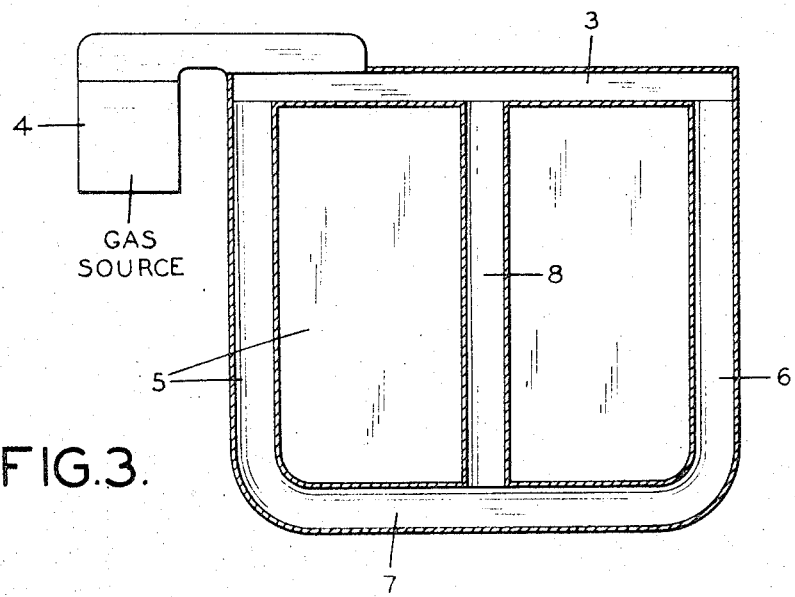

With reference to the following more detailed description of the invention, FIGS. 1 through 3 of the drawing should be referred to.

FIG. 1 is a simplified bag device of the invention looked at from an end view. FIG. 2 is a front view of the bag of FIG. 1. FIG. 3 is a view as seen from the position of the passenger of the rear seat of an inflated bag of one embodiment of the invention.

The bag of FIG. 1 is made up of inflatable tubes 1 connected together by non-inflatable areas of fabric 2 as shown in FIG. 2, the tubes 1 may be inflated from a manifold 3 which is connected to gas source 4 and alternate from one side A to the other side B. Upon gas being emitted from the gas source 4. on signal from a sensor device, not shown, the gas enters the manifold 3 and is directed into each tube 1. The bag which may be made of nylon, for example, before inflation is in a folded or rolled up position device, for example, in the inside roof of the rear seat of a car. On inflation the bag extends down toward the floor of the car, the tubular sections become inflated and carrying with them the non-inflatable sections connected to said tubular sections.

As can be readily seen, such construction allows for the inflation of a bag or curtain device which will retain the passengers in the rear seat of a car on collision without having to supply the gas necessary to inflate the whole bag, and thus either have prohibitive amounts of (1) gas generating material and/or (2) stored gas in the car or having the bag inflate too slowly to be extended in sufficient time.

In the preferred embodiment of the invention as shown in FIG. 3, the gas from the gas source 4 enters the manifold 3 and is distributed to inflatable panels which surround the outside circumference of the bag device on all sides but the side adjacent the manifold. Thus, the inflatable areas of the bag include the sides 5 and 6 and the bottom 7. In addition, if desired, a central inflatable portion or portions running from the top of the bag, from the manifold, to the lower edge (bottom) of the bag may be inflated to further ease and hasten the unfurling of the bag rapidly on inflation. Such a central portion is shown at 8 bisecting the bag area.

It is proposed that at least 30 percent of the area of the bag described be inflatable, but not more than about 80 percent and preferably about 50 percent.

While the invention has been described with relation to particular embodiments, it is the intention of the inventor that other bag embodiments besides that specifically discussed be within the scope of this invention. It is further intended that the invention be defined by the following claims.

We claim:

1. An inflatable restraint comprising inflatable areas and non-inflatable areas and a manifold through which inflating gas is supplied to said inflatable areas, said inflatable areas comprising a plurality of first tubular members lying in a vertical plane extending downwardly from said manifold, a second tubular member lying in said plane and interconnecting said plurality of first tubular members, said first and second tubular members forming the circumferential extent of said restraint, and said non-inflatable areas interconnecting said plurality of first tubular members and said second tubular members in said plane such that said inflatable areas comprising about 40 to 60 percent of the total surface area of the restraint.

* * * * *